Aug. 8, 1933. J. J. RAWLINGS 1,921,981
BOLT ANCHOR
Filed Feb. 24, 1932 2 Sheets-Sheet 1
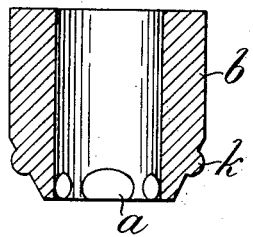
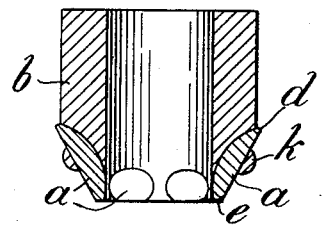
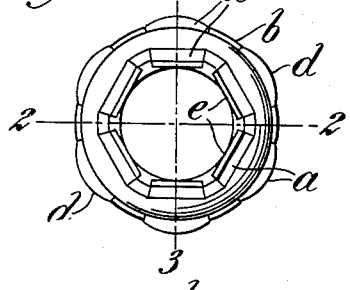
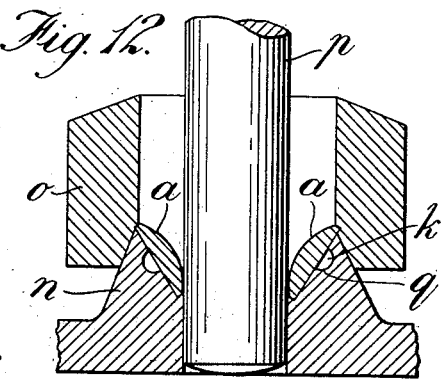
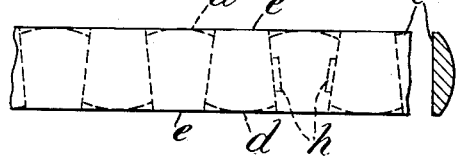
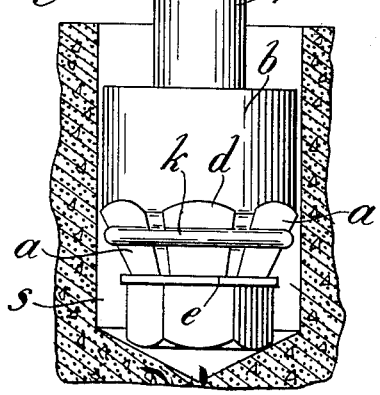
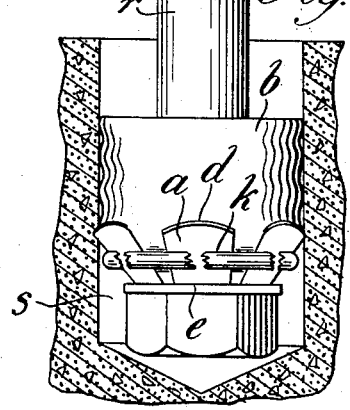
INVENTOR
John J. Rawlings
ATTORNEY Aug. 8, 1933.    J. J. RAWLINGS    1,921,981
BOLT ANCHOR
Filed Feb. 24, 1932    2 Sheets-Sheet 2
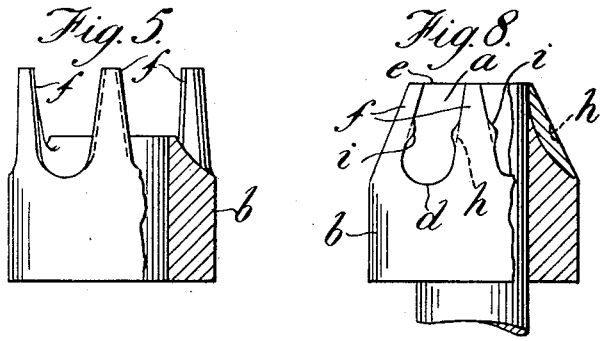
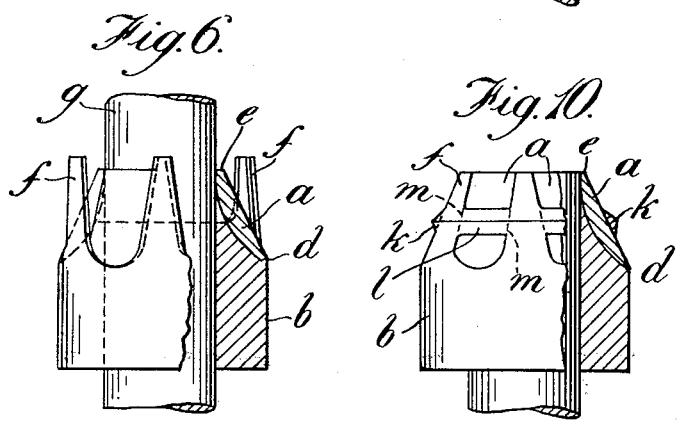
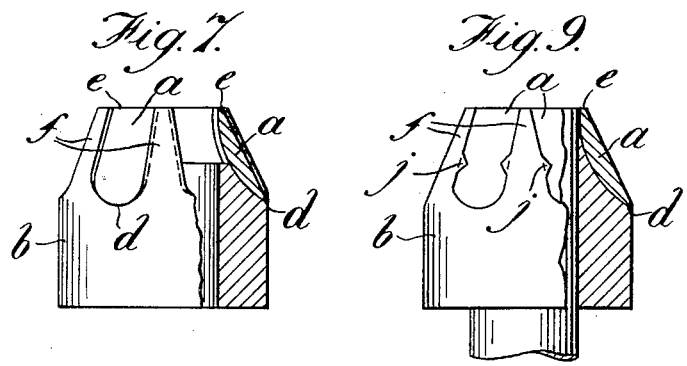
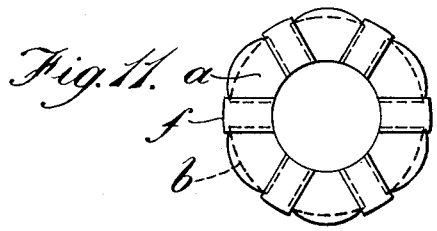
INVENTOR
John J. Rawlings
By 
ATTORNEY Patented Aug. 8, 1933

1,921,981

UNITED STATES PATENT OFFICE 1,921,981

BOLT ANCHOR

John Joseph Rawlings, London, England, assignor to The Rawlplug Company Limited, London, England Application February 24, 1932, Serial No. 594,951, and in Great Britain December 22, 1931

8 Claims. (Cl. 72—105)

This invention relates to an improved bolt anchor or device useful for securing bolts, hooks, railing posts and the like, in prepared holes in stone, concrete, brick or like floors, walls or similar structures.

Heretofore it has been known to anchor a bolt in a prepared hole by means of a bolt anchor comprising a part made of soft ductile metal such as lead and a part of hard inflexible metal such as chilled cast iron, the part of hard metal being of a hollow substantially conical form with radially and axially extending grooves or slots in its surface providing planes of weakness along which this metal part can be broken more or less readily to divide it into separate parts or segments.

After the bolt has been placed in the hole with the head thereof at the bottom of the hole the anchor is pushed down the shank of the bolt into contact with the bolt head within the hole. The soft metal is then expanded by using a caulking or tamping tool and in this operation the conical hard metal part is split into a number of segments occupying inclined positions each segment with one end resting in the corner between the shank and the head of the bolt and the other end pressed against the wall of the hole. Any pull exerted on the bolt tending to draw it out of the hole will then be firmly resisted by the hard metal pieces acting as struts.

The improved bolt anchor in accordance with this invention can be employed in a manner similar to that above described and comprises a soft metal part having detached or separate hard metal parts set therein each hard metal part being provided at one end with a straight edge and at the other end with a segmental edge, these edges being formed in the same plane at opposite ends of a flat face of the hard metal part. The hard metal parts can be formed from pieces of metal rod of semi-circular or segmental cross section, the straight and segmental edges being formed at the intersection of the cylindrical and the flat sides of each piece, the intermediate parts of each piece increasing in thickness towards the middle portion thereof.

In the accompanying drawings:

Figure 1 shows a plan view of a bolt anchor in accordance with this invention.

Figures 2 and 3 show sectional views thereof on the lines 2—2 and 3—3, Figure 1, respectively.

Figure 4 is a view illustrating how the hard metal parts can be economically cut from a bar of suitable metal.

Figures 5, 6 and 7 illustrate successive stages in the production of the improved bolt anchor, according to one method of manufacturing the same.

Figures 8, 9, 10 and 11 illustrate modified forms of the improved bolt anchor.

Figure 12 shows a suitable form of mould in which the hard metal parts can be assembled and the soft metal parts cast to form a completed bolt anchor.

Figure 13 shows the improved bolt anchor threaded on a bolt and inserted in a hole prepared to receive the same.

Figure 14 is a similar view showing the bolt anchor after the soft metal part thereof has been expanded and the hard metal parts brought to positions to act as struts between the head of the bolt and the wall of the hole.

As shown in the drawings $a$ are hard metal parts inlaid in a soft metal part $b$, (Figures 1, 2 and 3). The hard metal parts can be cut economically from a rod or bar $c$, Figure 4, by shearing off pieces of the required size, each cut alternately being oppositely inclined relatively to a transverse line at right angles to the longitudinal edges of the rod or bar so that the pieces cut off are of a tapered form. Pieces of the requisite form can be cut by a die shearing both edges of the piece simultaneously. Preferably the rod or bar is of semi-circular or segmental cross section so that the metal parts are thicker in the middle than at the ends. As shown the broader end $d$ of each part $a$ is curved, for example, by stamping or grinding and the narrower end $e$ has a straight edge, which may be a part of the original edge of the rod or bar or may be specially cut or formed by a die or the like.

The bolt anchor can be produced, by casting a soft metal part $b$, Figure 5, with fingers or projections $f$. Whilst this soft metal part is held on a mandrel $g$, Figure 6, the hard metal parts $a$ are placed in position in the spaces between the finger $f$. Then by means of a conical die, the said fingers can be pressed inwards between the hard metal parts to hold the latter in place, forming a conical end to the bolt anchor.

In some cases, if desired, depressions $h$ (Figure 8) may be formed at or near the edges of the hard metal parts $a$ so that when the soft metal fingers are compressed between the hard metal parts some of the soft metal flows or is extruded into these depressions and forms keys or tongues $i$ overlying the depressed parts. In Figure 9, in place of the said depressions, slots or grooves *j* are formed in the edges of the hard metal parts *a* and the soft metal under pressure of a suitable die expands into these slots. The die employed may be suitably shaped to form a band around the conical portion of the bolt anchor as shown at *k*, connecting bars *l* of soft metal being provided extending between the fingers *f* before the latter are contracted to a conical form. When the fingers are bent or compressed between the hard metal parts the bars *l* may lie on the outer flat surfaces of the hard metal parts forming a ring extending entirely around the bolt anchor, or the hard metal parts may be formed as in Figure 10, with transverse grooves *m* so that the bars *l* may be embedded therein.

The fingers *f* may be offset or project from the outside of the soft metal part *b*, being prolongations of ribs formed on the said part as shown in Figure 11, and the segmental edge of each hard metal part may be of suitable radius so as to lie within, to be level with or to protrude beyond the outside surface of the soft metal part or of the fingers.

Alternatively, the bolt anchor can be formed by casting the soft metal part in a mould after the hard metal parts have been set therein. A convenient form of mould, as shown in Figure 12, comprises two outer parts *n*, *o* and a mandrel *p*. The pieces of hard metal can be set with the flat faces thereof in a pyramidal formation in the mould part *n* preferably with spaces between the pieces, and after the mandrel *p* and mould part *o* have been put in position the molten soft metal can be poured into the mould. The hard metal parts thus embedded in the soft metal are preferably set each with its straight or narrower edge at the end of the anchor which is of smaller cross section by reason of the pyramidal shape of the mould part *n*. The inner walls of the mould parts *n*, *o* are preferably so formed at their adjacent parts that the curved edge *d* of each part *a* projects slightly beyond the outer surface of the soft metal part *b*.

The mould part *n* can be formed with an annular groove *q* into which the molten metal flows, so that bands *k* of soft metal are formed outside the hard metal parts to hold the latter in place. These bands need not be continuous from side to side across the outer faces of the hard metal parts. In place of continuous bands, short lugs may be provided by forming short recesses in the mould part *n*, or recesses *h* similar to those shown in Figure 8 may be formed in the hard metal parts, into which soft metal from between the hard metal parts can flow.

After the bolt anchor has been placed on a bolt shank *r* and placed in a hole *s*, (Figures 13 and 14) the soft metal can be driven down to force the curved edges *d* of the hard metal parts *a* into contact with the wall of the hole and these hard metal parts then act as struts between the head of the bolt and the wall of the hole to prevent the bolt from being drawn out of the hole.

I claim:

1. A bolt anchor comprising a part of soft ductile metal and separate hard metal parts inlaid in the soft metal and having flat faces arranged in pyramidal formation on the outer surface at one end of the bolt anchor.

2. A bolt anchor comprising a part of soft ductile metal having a part of its outer surface of conical form, and separate hard metal parts each having a flat face and respectively inlaid individually in the conical surface of the soft metal, the hard metal parts each having a segmental edge at one end.

3. A bolt anchor comprising a part of soft ductile metal having a part of its outer surface of conical form and separate hard metal parts each having a flat face and respectively inlaid individually in the conical surface of the soft metal, the hard metal parts each having a segmental edge at one end and a straight edge at the opposite end thereof.

4. A bolt anchor comprising a part of soft ductile metal having a part of its surface of conical form and detached hard metal parts spaced apart and inlaid in the soft metal, with flat outer faces arranged in pyramidal form and with straight and segmental edges at opposite ends of the hard metal parts which increase in thickness from the said edges towards the middle portion thereof.

5. A bolt anchor comprising a part of soft metal and separate hard metal parts inlaid in the soft metal, and having flat faces arranged in pyramidal formation on the outer surface of the soft metal, each hard metal part having a segmental end edge and a straight end edge, with tapering lateral sides.

6. A bolt anchor comprising a part of soft metal and separate hard metal parts inlaid individually in the soft metal with flat outer faces arranged in pyramidal formation, the said hard metal parts having recessed walls at parts thereof and tongues or bands of the soft metal extruded into the said recessed parts of the hard metal parts.

7. A bolt anchor comprising a part of soft ductile metal, and detached hard metal parts inlaid in the exterior surface of the soft metal, the said hard metal parts having flat outer faces disposed in pyramidal formation.

8. A bolt anchor comprising a tubular part of soft ductile metal having the outer surface at one end thereof of conical form, and detached hard metal parts inlaid in the said part of conical form with flat outer faces of the hard metal parts disposed in pyramidal form.

JOHN JOSEPH RAWLINGS.